Patented Dec. 22, 1942

2,305,908

UNITED STATES PATENT OFFICE 2,305,908

SALT GLAZING

Enos A. Stewart, near Canton, Ohio

No Drawing. Application October 25, 1940,
Serial No. 362,837

10 Claims. (Cl. 25—156)

The invention relates to salt glazing of ceramic ware and more particularly to an improved method of salt glazing which will prevent crazing of the glazed surface of the ware.

The method of salt glazing in common practice in the ceramic industry consists in introducing common salt or sodium chloride into the kiln containing the ware generally during the later stages of the firing or burning, but throwing the salt upon the fires or otherwise introducing it into the kiln, so that it will volatilize and combine with the surface portion of the ware to form a glaze thereon.

As this method of glazing is quite simple and inexpensive it is commonly used throughout the industry in the production of a wide range of ceramic ware such as brick, tile, sewer pipe, stoneware, etc.

It is common experience of manufacturers of such ware however, that the glazed surfaces produced in this manner are generally so badly crazed that the entire glazed surface is a network of fine cracks.

This condition not only results in an imperfect glaze, but spoils the appearance of the ware, particularly where the ware is light colored, as ink or the like coming in contact with the crazed surface will permanently mar the same, discoloring the tiny cracks in the surface and resisting all efforts to remove the discoloration.

It is the object of the present invention to improve the quality of the glaze, and to eliminate or greatly minimize the crazing or cracking of the glazed surface upon the ware.

I have discovered that a much improved glaze results if the ware after being burned and salt glazed in usual and customary manner is allowed to cool to the critical temperature at which salt glaze crazes, and the ware is then reburned, being brought as rapidly as possible to the maximum temperature, and again cooled in customary manner.

In carrying out the improved salt glazing process the ware is first burned and salt glazed in usual and well-known manner, being burned for four and a half or five days and brought to a maximum temperature of approximately 1900° F. to 2000° F., salt or other alkaline chlorides alone or in combination with the salt being thrown into the fires of the kiln or otherwise introduced into the kiln during the later stages of the burn, as in usual practice.

The ware in the kiln is then allowed to cool in usual manner until it reaches the temperature at which the salt glaze crazes, which is about, or slightly below 572° F.

The ware is then reburned, the kiln being heating the ware, from the critical temperature, of not over 2000° F., and held at this temperature for a short time.

Very good results have been obtained by reheating the ware, from the critical temperature, for a period of about seventy-two hours. This reburning of the ware may be carried out in an oxidizing, reducing or neutral atmosphere.

After this reburning, the ware is cooled as in usual practice to the point where it may be removed from the kiln, and ware treated in this manner has a much improved glaze, with practically no trace of crazing or cracking of the glazed surface.

I claim:

1. The method of salt glazing ceramic ware which comprises volatilizing alkaline chloride in a kiln containing the ware during the burning thereof to produce a salt glaze upon the ware, cooling the ware down to the point where the salt glaze crazes, and then reburning the salt glazed ware.

2. The method of salt glazing ceramic ware which comprises volatilizing alkaline chloride in a kiln containing the ware during the burning thereof to produce a salt glaze upon the ware, cooling the ware down to the point where the salt glaze crazes, and then reburning the salt glazed ware for a shorter period than the original burning.

3. The method of salt glazing ceramic ware which comprises volatilizing alkaline chloride in a kiln containing the ware during the burning thereof to produce a salt glaze upon the ware, cooling the ware down to the point where the salt glaze crazes, and then reburning the salt glazed ware, the ware being rapidly brought to the maximum temperature during the reburning thereof.

4. The method of salt glazing ceramic ware which consists in burning the ware in a kiln for a period of approximately four and a half days, in an oxidizing atmosphere, the ware being burned to a temperature of about 1900° F. to 2000° F., volatilizing alkaline chloride in the kiln containing the ware during the burning thereof, then cooling the ware down to approximately 572° F., then reburning the ware for a period of about seventy-two hours, the ware being rapidly brought up to a temperature of not over 2000° F. during the reburning thereof.

5. The method of salt glazing ceramic ware which comprises volatilizing sodium chloride in a kiln containing the ware during the burning thereof to produce a salt glaze upon the ware, cooling the ware down to the point where the salt glaze crazes, and then reburning the salt glazed ware.

6. The method of salt glazing ceramic ware which comprises volatilizing sodium chloride in a kiln containing the ware during the burning thereof to produce a salt glaze upon the ware, cooling the ware down to the point where the salt glaze crazes, and then reburning the salt glazed ware for a shorter period than the original burning.

7. The method of salt glazing ceramic ware which comprises volatilizing sodium chloride in a kiln containing the ware during the burning thereof to produce a salt glaze upon the ware, cooling the ware down to the point where the salt glaze crazes, and then reburning the salt glazed ware, the ware being rapidly brought to the maximum temperature during the reburning thereof.

8. The method of salt glazing ceramic ware which consists in burning the ware in a kiln for a period of approximately four and a half days, in an oxidizing atmosphere, the ware being burned to a temperature of about 1900° F. to 2000° F., volatilizing sodium chloride in the kiln containing the ware during the burning thereof, then cooling the ware down to approximately 572° F., then reburning the ware for a period of about seventy-two hours, the ware being rapidly brought up to a temperature of not over 2000° F. during the reburning thereof.

9. The method of salt glazing ceramic ware which consists in burning the ware in a kiln for a period of approximately four and one-half days in an oxidizing atmosphere, volatilizing sodium chloride in the kiln containing the ware during the burning thereof, then cooling the ware down to approximately 572° F., then rapidly raising the temperature of the ware and reburning the ware for a period of about seventy-two hours.

10. The method of salt glazing ceramic ware which consists in burning the ware in a kiln for a period of approximately four and one-half days in an oxidizing atmosphere, volatilizing alkaline chloride in the kiln containing the ware during the burning thereof, then cooling the ware down to approximately 572° F., then rapidly raising the temperature of the ware and reburning the ware for a period of about seventy-two hours.

ENOS A. STEWART.